March 8, 1955           A. FELIX           2,703,692
SUPPORT FOR SHELVING
Filed March 22, 1950
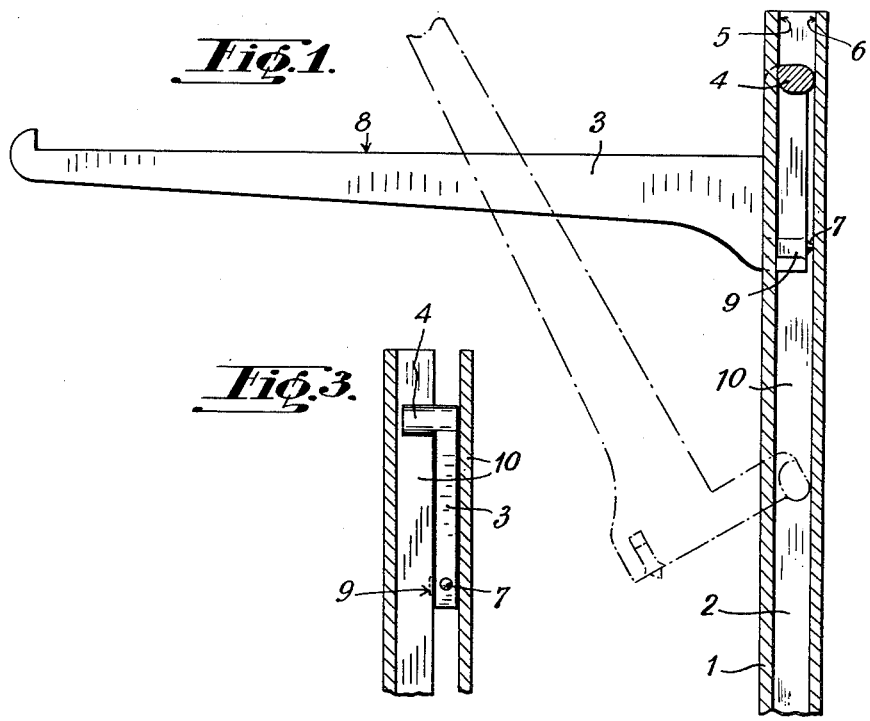
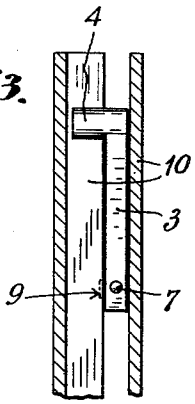
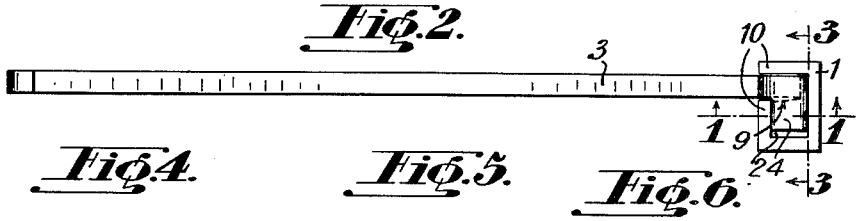
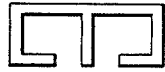
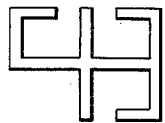
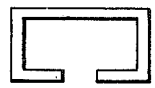
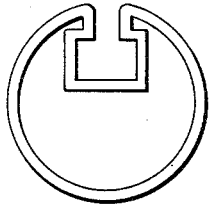
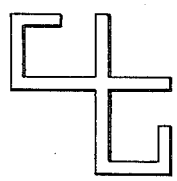
INVENTOR
ANDRE FELIX
by
Campbell, Brumbaugh, Free & Graves
his ATTORNEYS.

United States Patent Office 2,703,692
Patented Mar. 8, 1955

2,703,692
SUPPORT FOR SHELVING
André Felix, Lausanne, Switzerland

Application March 22, 1950, Serial No. 151,273

1 Claim. (Cl. 248—244)

The present invention relates to a support for shelving which is characterized in that it comprises at least one shaped upright with at least one supporting arm provided with a part forming a cam which wedges into the upright when the said arm is in working position, this part being free to slide along the upright when the arm is withdrawn from the said position.

The support according to the invention preferably comprises uprights having at least one longitudinal groove, the part of the supporting arms forming a cam being shaped so as to wedge itself between opposite walls of the said grooves and the supporting arms bearing against the upright when they are brought into working position.

The accompanying drawing shows, by way of example, one embodiment of the support according to the invention.

Figs. 1 and 2 are partial views in elevation and in plan respectively, Fig. 1 being taken along the line 3—3 of Fig. 2.

Fig. 3 is a section along the line 3—3 of Fig. 2.

Figs. 4 to 9 show varied forms of sections suited to form uprights.

The support shown comprises a shaped upright 1 having a longitudinal groove 2 of L cross section, which cooperates with a supporting arm 3, adapted to support a shelf, not shown, provided with a side projection 4 forming a cam which wedges between the opposite walls 5 and 6 of the groove 2 when the said arm is in working position, as shown in full lines in Fig. 1, the said side projection 4 having such a shape that it may freely slide in the groove 2 of the upright when the arm 3 is withdrawn from the working position, for example, as shown by dot-and-dash lines in Fig. 1.

In the working position shown in Fig. 1, the arm 3 bears against the wall 6 of the upright 1 and against the latter through the agency of a point 7, the side projection 4 and the said point being arranged with respect to the supporting face 8 of the arm in such a way that the force, applied by the said point against the wall of the upright, increases with the weight bearing on the arm. The point 7 is of a harder metal than the upright 1 and penetrates slightly into the wall 6 of the latter and assists in preventing the sliding of the arm along the upright, in particular when the arm is acted upon by an important load. In order to move the arm, it is sufficient to bring it into a position such as the one shown in dot-and-dash lines and to cause the projection 4 to slide in the upright. When at the required height, the setting in the working position of the arm 3 ensures the gripping of the projection 4 against the walls of the groove and thereby the securing of the arm to the upright, it being possible to move the arm at will on the upright and secure it at any point on the latter.

The arm 3 is also provided with a wedge-shaped projection 9 arranged in such a manner that it engages under the wall 10 of the groove when the arm is brought into its working position in order to hold the arm in the said position. The passage of the projection 9 into the opening of the groove 2 is made possible by a slight temporary deformation of the upright.

Figs. 4, 5, 7 and 8 show modified forms of the shaped upright comprising several L-shaped grooves arranged either side by side, as in the embodiment of Fig. 4, or back to back, as shown in the embodiment of Fig. 7.

The support according to the invention may comprise one or more uprights, of identical or different profiles following the general form of the shelving, each carrying supporting arms, the number of which will be adapted to the number of shelves contemplated.

According to an embodiment not shown, the part of the supporting arm forming a cam is constituted by two co-axial side projections provided on the opposite faces of the arm. In such a case, the groove of the shaped upright will be T-shaped as shown, for example, in Figs. 6 and 9.

What I claim is:

A support for shelving comprising a hollow upright and a load receiving member vertically adjustable therealong, said upright having a front wall and a rear wall, said front wall having a slot extending longitudinally thereof and spaced apart edges on opposite sides of said slot, said load receiving member comprising a shelf receiving arm and a second arm substantially perpendicular to said shelf receiving arm and extending upwardly therefrom, said second arm extending substantially lengthwise of said slot and being releasably received in the hollow upright, a cam member adjacent the upper end of said second arm and above the upper edge of said shelf-receiving arm, said cam member having a narrow portion and a wider portion of sufficient width to engage both the front and rear walls of the upright simultaneously when the shelf receiving arm is substantially horizontal, a pointed stud adjacent the lower end of said second arm and below the upper edge of the shelf-receiving arm to engage the rear wall of said upright, and a wedge-shaped portion projecting laterally from said second arm adjacent to said stud to engage one of said spaced apart edges and wedge the second arm against the other of said spaced apart edges when the shelf-receiving arm is substantially horizontal, said cam member, extension and pointed stud cooperating to hold the shelf receiving member in a preselected position relative to the upright, and said load receiving member being releasable to slide it in the upright by tilting the horizontal arm upward and thereby rotating the cam member to disengage it from the front and rear walls, moving said extension out of wedging engagement with said one edge and disengaging the pointed stud from the rear wall of the upright.

References Cited in the file of this patent
UNITED STATES PATENTS

| Number | Name | Date |
|---|---|---|
| 768,929 | Breese | Aug. 30, 1904 |
| 985,079 | Venard | Feb. 21, 1911 |
| 1,041,264 | Freud | Oct. 15, 1912 |
| 2,477,735 | Gentile | Aug. 2, 1949 |

FOREIGN PATENTS

| Number | Country | Date |
|---|---|---|
| 234,585 | Germany | of 1911 |
| 834,517 | France | Aug. 22, 1938 |